United States Patent
Anstey

[19]

[11] Patent Number: 6,098,390
[45] Date of Patent: Aug. 8, 2000

[54] ROUND BALER BELT SUPPORT ROLL CONSTRUCTED FOR DEFLECTING CROP MATERIAL AWAY FROM ROLL CLEARANCE GAPS IN BALING CHAMBER SIDE WALLS

[75] Inventor: Henry Dennis Anstey, Ottumwa, Iowa

[73] Assignee: Deere & Company, Moline, Ill.

[21] Appl. No.: 09/185,435

[22] Filed: Nov. 3, 1998

[51] Int. Cl.[7] .................................................. A01D 75/00
[52] U.S. Cl. .................................... 56/341; 56/1; 198/497
[58] Field of Search .................................. 56/16.4 B, 341, 56/342, 343, 1; 198/497

[56] References Cited

U.S. PATENT DOCUMENTS

| | | | |
|---|---|---|---|
| 3,794,047 | 2/1974 | De Coene et al. | 56/14.6 |
| 4,428,282 | 1/1984 | Anstey . | |
| 4,581,879 | 4/1986 | Anstey | 56/341 |
| 4,890,449 | 1/1990 | Heing . | |
| 4,910,949 | 3/1990 | Meyer | 56/341 |
| 5,347,801 | 9/1994 | McIlwain | 56/341 |
| 5,603,206 | 2/1997 | Horchler, Jr. | 56/341 |

FOREIGN PATENT DOCUMENTS

| | | |
|---|---|---|
| 0 152 085 A | 8/1985 | European Pat. Off. . |
| 196 09 926 A | 9/1997 | Germany . |
| 2 089 403 A | 1/1990 | United Kingdom . |

*Primary Examiner*—Robert E. Pezzuto
*Assistant Examiner*—Nathan Mammen

[57] ABSTRACT

A large round baler bale-forming belt drive roll has cylindrical sections at its opposite ends which extend through circular holes provided in the opposite side walls of the baling chamber. The cylindrical sections are smaller in diameter than the circular holes, thus leaving clearance gaps between the cylindrical sections and the boundaries of the holes. A pair of wipers, in the form of rod or wire stock, are welded at diametrical opposite locations on the cylindrical sections and are located in the adjacent clearance gap. The wipers are angled relative to the axis of rotation of the roll so that as the roll rotates the wipers sweep through the gaps and cause any crop material engaged there to be moved inwardly from the adjacent bale chamber side wall.

8 Claims, 1 Drawing Sheet

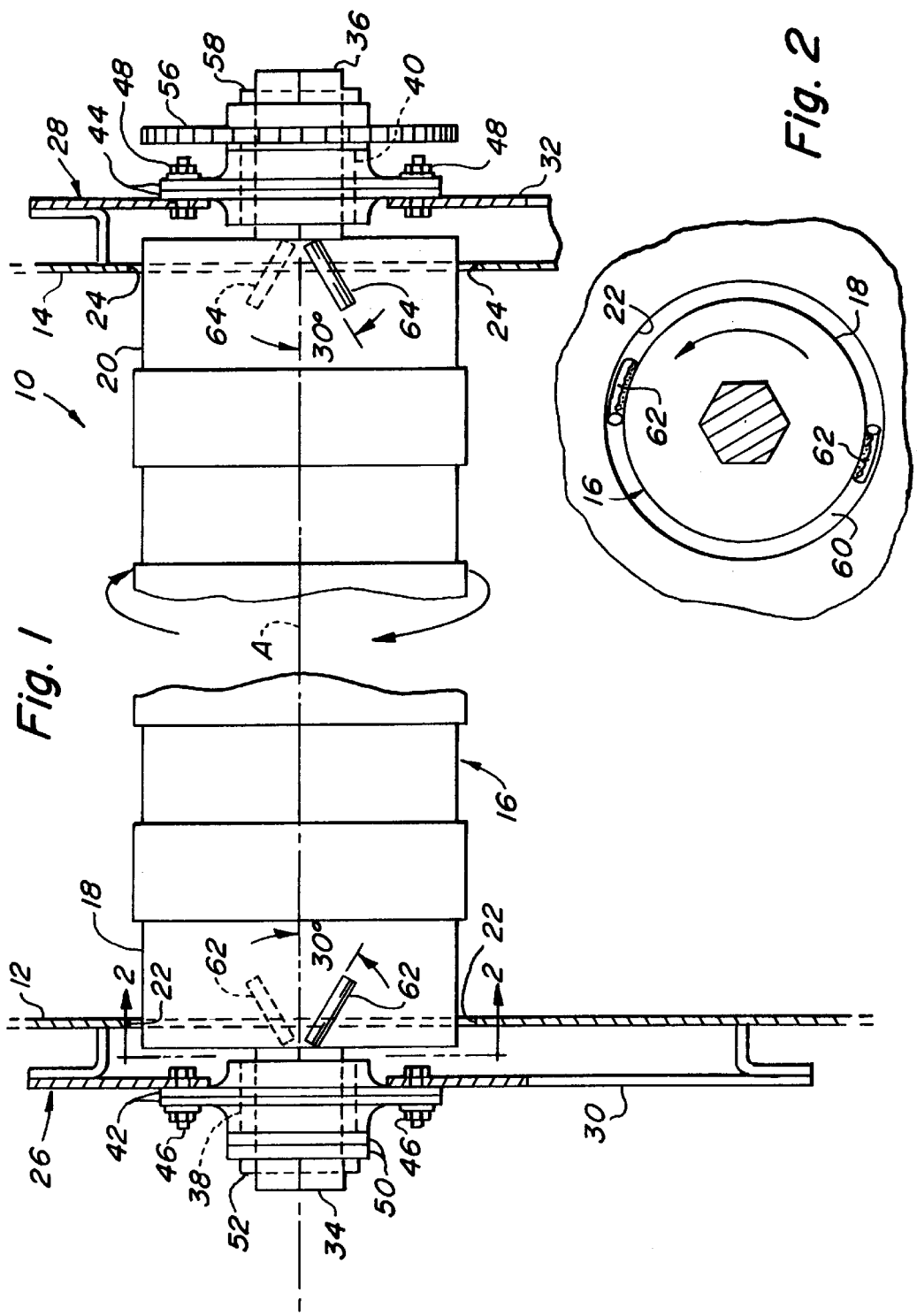

ROUND BALER BELT SUPPORT ROLL CONSTRUCTED FOR DEFLECTING CROP MATERIAL AWAY FROM ROLL CLEARANCE GAPS IN BALING CHAMBER SIDE WALLS

BACKGROUND OF THE INVENTION

The present invention relates to round balers and more specifically relates to bale-forming belt support rolls for such balers.

When baling with a typical large round baler, it is common for the exterior surface of the bale to contact bale-forming belts engaged with a rotating roll adjacent the respective areas where the opposite end portions of the roller goes through the sheet material forming the opposite side walls of the baling chamber. U.S. Pat. No. 4,428,282 granted to Anstey on Jan. 31, 1984 discloses a large round baler having a roll of this type. A disadvantage of this type of structure is that crop material can become wedged or packed between the outside diameter of the roll and the side sheet surface defining the holes. This wedging can cause a host of problems including excess bearing load, wear on the roll, and high friction. In addition, crop which gets outside of the side sheets is subject to getting wrapped or wedged against the bearings possibly causing them to fail prematurely.

SUMMARY OF THE INVENTION

According to the present invention, there is provided an improved bale-forming belt support roll construction.

An object of the invention is to provide a bale-forming belt support roll constructed so as to substantially prevent crop material from passing through and/or becoming packed in the clearance gaps defined between cylindrical sections of respective ends of the roll and the perimeters of the circular holes provided in the side sheets.

A more specific object of the invention is to provide a roll, as set forth in the previous object, which includes wiper structures mounted to the cylindrical sections so as to rotate within the clearance gaps and cause crop material to be forced away from the side sheets of the baling chamber.

Yet a more specific object of the invention is to provide a drive roll, as set forth in the immediately preceding object, wherein the wiper structures include a pair of rods welded to each of the roll cylindrical sections at diametrically opposite locations, the rods being angled relative to the axis of the roll so as to force crop material away from the side sheets of the baling chamber.

These and other objects of the invention will become more apparent from a reading of the ensuing description together with the appended drawings.

BRIEF DESCRIPTION OF THE DRAWINGS

FIG. 1 is a top plan view of a bale-forming belt drive roll of a large round baler showing the roll located in respective circular holes provided in the right- and left-hand side walls of the baling chamber.

FIG. 2 is a vertical sectional view taken along line 2—2 of FIG. 1.

DESCRIPTION OF THE PREFERRED EMBODIMENT

Preliminarily, it should be noted that the terms "right-hand" and "left-hand" are made from the view point of an observer standing behind the implement and facing in the forward direction of travel.

Referring now to the drawings, there is shown (FIG. 1) a portion of a baling chamber 10 of a large round baler, the chamber 10 including right- and left-hand side walls or side sheets 12 and 14, respectively. A bale-forming belt drive roll 16 extends between the side walls 12 and 14 and includes right- and left-hand cylindrical end sections 18 and 20 that respectively extend through axially aligned circular holes 22 and 24 provided in the side walls 12 and 14.

Right- and left-hand bearing support structures 26 and 28 are respectively fixed to outer surfaces of the side walls 12 and 14 and include respective support plates 30 and 32 disposed in parallel relationship to the walls 12 and 14. The roll 16 includes right- and left-hand shaft end sections 34 and 36, respectively, that are received in right- and left-hand bearings 38 and 40 that are pressed into right- and left-hand pairs of bearing flanges 42 and 44, the pair of flanges 42 being secured to the support plate 30 by bolts 46, and the pair of flanges 44 being secured to the support plate 32 by bolts 48. Located outboard of the pair of bearing flanges 42 are a pair of washers 50 followed by a retaining pin 52, and located outboard of the pair of bearing flanges 44 is a washer 54 followed by a drive sprocket 56 and a retaining pin 58.

As best seen in FIG. 2, a clearance gap 60 is defined between the right-hand cylindrical end section 18 of the drive roll 16 and the perimeter of the circular hole 22, it to be understood that a similar clearance gap is defined between the left-had cylindrical end section 20 and the perimeter of the circular hole 24 in the left-hand side wall 14. In order to accommodate for manufacturing inaccuracies in the roundness of the roll 16 and/or placement of the roll relative to the center of the hole 22, the gap 60 in the preferred embodiment is sized to be ¼"+¹⁄₁₆".

Up to this point, the structure described is more or less conventional. It is to be understood that while a drive roll is disclosed, the invention described below would find utility with any other bale-forming belt support roll which extends through the side sheets or, even with rolls used in other crop processing machines which would use rolls in an environment where they come into contact with crop materials that might find its way through clearance gaps in the side sheets.

Welded to diametrically opposite locations of the cylindrical sections 18 and 20 of the roll 16 are right- and left-hand pairs of wipers or deflectors 62 and 64 that respectively extend into the clearance gap 60 provided in the right-hand wall 12 and into the clearance gap formed between the left-hand roll section 20 and the perimeter of the hole 24 in the left-hand side wall 14. The wipers 62 and 64 are each angled relative to the axis A of the roll 16 and are disposed such that they tend to move crop material away from the side walls 12 and 14. It has been found that the wipers 62 are particularly effective in moving crop material inwardly if they are angled from between 30° to 60° relative to the roller axis A. In the preferred embodiment, the wipers 62 and 64 extend radially beyond the surfaces of the cylindrical sections 18 and 20 by a distance approximately equal to ³⁄₁₆". While the wipers 62 and 64 could take many forms, including being made of weld material, they are preferably constructed of wire or cylindrical rod or bar stock welded to the roll 16, with the weld being applied to the trailing side of the wiper so that a fairly smooth leading edge is presented to the crop material being wiped away. Also, it is to be noted that the wipers 62 and 64 work well if their outer ends extend so as to be approximately even with the opposite ends of the roller 16 and if their inner ends are located just inboard of the side sheets 12 and 14. The inner ends must be located far enough inwardly from the side sheets 12 and 14 to keep the area clear but not so much as to encourage crop wrappage around the end of the roll. It is also important to keep the distance between the inner ends of the wipers 62 and 64 and the side sheets 12 and 14 relatively small in order to minimize or prevent contact between the wipers and the adjacent bale-forming belts, which normally operate in close proximity to the side walls 12 and 14. A distance of 5 mm. has been found to work satisfactorily. Further, it is noted that while a pair of wipers are disclosed at each of the opposite ends of the roll 16, it has been found that a single wiper will also be effective in keeping crop material from passing through and/or wedging in the gap defined between the boundary of the roll cylindrical section 18 and the side sheet hole 22, and between the boundary of the cylindrical roll section 20 and the side sheet hole 24.

The operation of the invention is thought to be clear from the foregoing description. Suffice it to say that, as the drive roll 16 rotates, the wipers 62 and 64, respectively, engage crop material in the vicinity of the gap 60 and the corresponding gap at the opposite side of the baling chamber, and move this crop material inwardly so that it does not pass through the gaps.

What is claimed is:

1. In a crop harvesting machine including opposite side walls for containing crop there between, said side walls respectively having first and second circular openings formed therein, a roll extending between said walls and having first and second cylindrical sections respectively, projecting through said first and second circular openings and cooperating with respective boundaries of said openings to define respective clearance gaps, the improvement comprising: first and second wipers respectively being fixed to said first and second cylindrical sections and respectively extending into an adjacent one of the clearance gaps, whereby rotation of said roll will result in said wipers sweeping through the clearance gaps said wipers being angled relative to a longitudinal axis of said roll so as to deflect crop material inwardly away from said opposite side walls.

2. The crop harvesting machine defined in claim 1 wherein said wipers are each angled from 30° to 60° to said longitudinal axis.

3. The crop harvesting machine defined in claim 1 wherein third and fourth wipers are respectively provided at said first and second cylindrical sections at locations which are diametrically opposite to said first and second wipers.

4. The crop harvesting machine defined in claim 1 wherein said first and second wipers are in the form of rods.

5. The crop harvesting machine defined in claim 1 wherein said gaps are sized to be ¼"+¹⁄₁₆" and said wipers are dimensioned so as to project radially beyond the surfaces of the cylindrical sections of the roll by a distance approximately equal to ³⁄₁₆".

6. The crop harvesting machine defined in claim 1 wherein said first and second wipers respectively extend to the ends of said first and second cylindrical sections.

7. The crop harvesting machine defined in claim 1 wherein said first and second wipers respectively have inner ends spaced inwardly from said opposite side walls from between ⅛" to ¼".

8. The crop harvesting machine defined in claim 1 wherein said opposite side walls define opposite sides of a baling chamber of a large round baler; and said roll being a bale-forming belt support roll.

* * * * *

UNITED STATES PATENT AND TRADEMARK OFFICE
CERTIFICATE OF CORRECTION

PATENT NO.    : 6,098,390                                       Page 1 of 1
DATED         : August 8, 2000
INVENTOR(S)   : Henry Dennis Anstey It is certified that error appears in the above-identified patent and that said Letters Patent is hereby corrected as shown below:

Column 4,
Line 17, delete "+" and insert -- ± --.

Signed and Sealed this

Twenty-fourth Day of December, 2002

JAMES E. ROGAN
*Director of the United States Patent and Trademark Office*